Dec. 14, 1965     D. D. TOWNE     3,223,264
FORAGE WAGON WITH ROTATING KEY CLUTCH
Filed Dec. 5, 1962     2 Sheets-Sheet 1
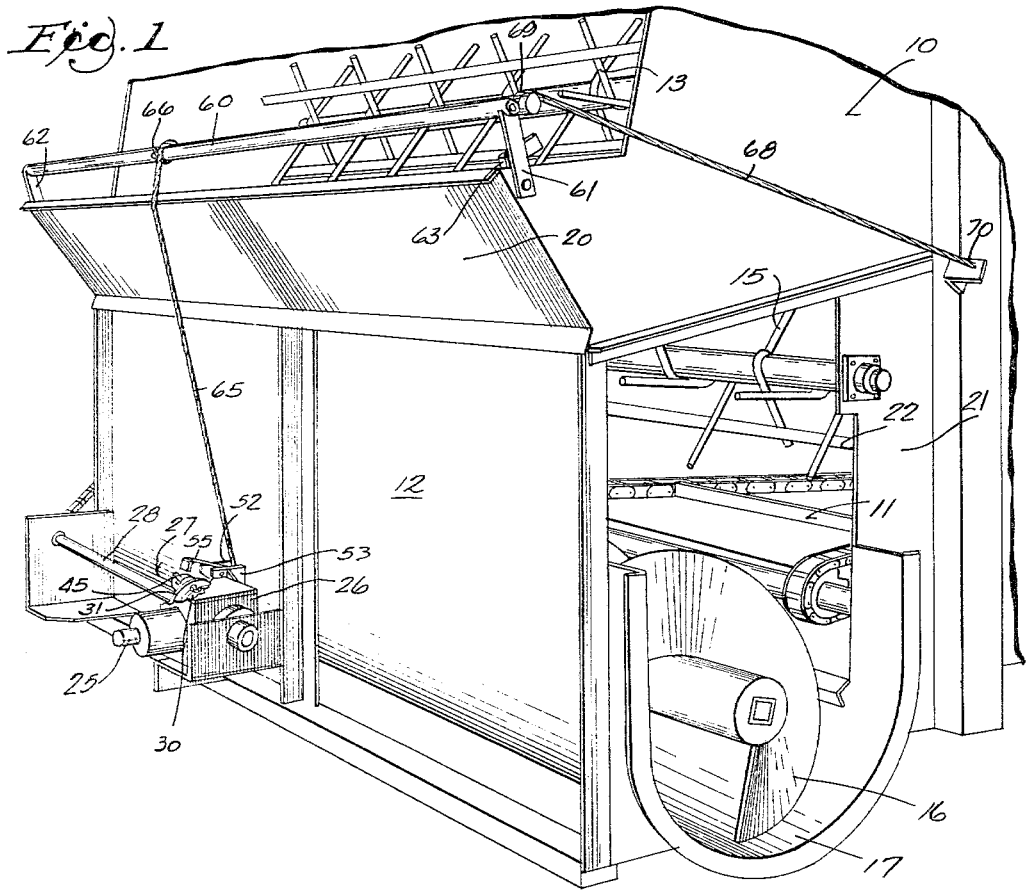
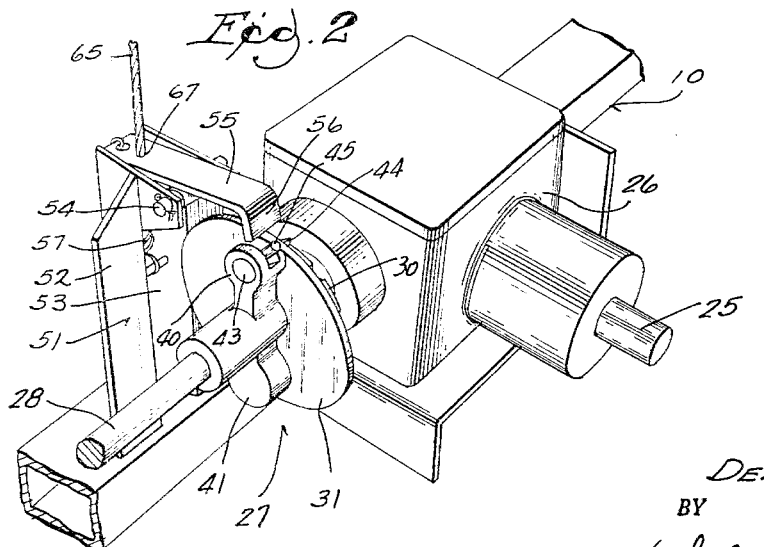
INVENTOR.
DELBERT D. TOWNE
BY
Wheeler, Wheeler & Wheeler
ATTORNEYS

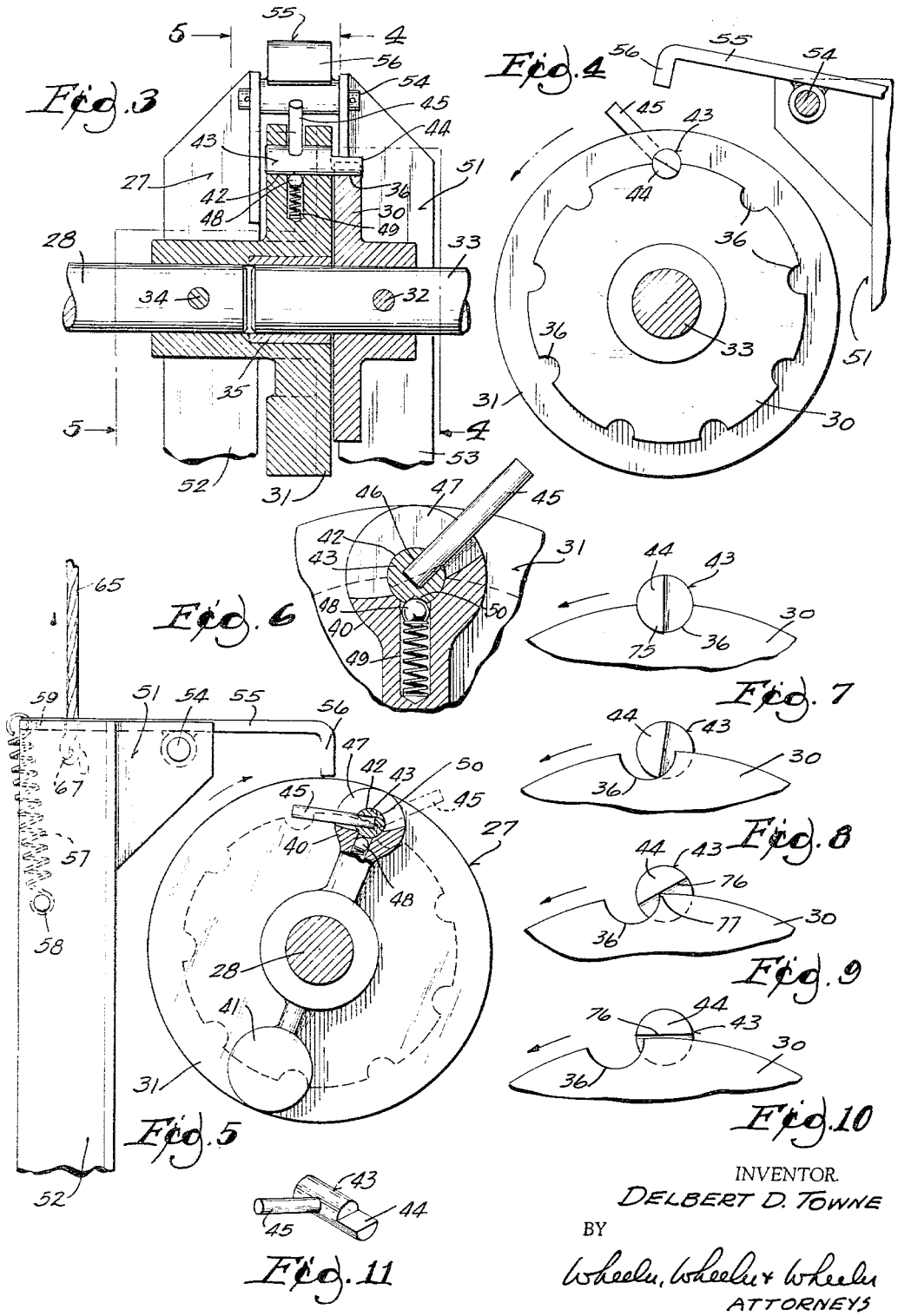

United States Patent Office 3,223,264
Patented Dec. 14, 1965

3,223,264
FORAGE WAGON WITH ROTATING KEY CLUTCH
Delbert D. Towne, Rochester, Minn., assignor to Kasten Mfg. Corp., Allenton, Wis., a corporation of Wisconsin
Filed Dec. 5, 1962, Ser. No. 242,415
6 Claims. (Cl. 214—519)

This a continuation-in-part of my application Serial No. 226,988 filed September 28, 1962.

This invention relates to safety release mechanism for power operated machinery whereby to quickly and positively disengage a power connection.

More particularly stated, the invention relates to a quick release clutch readily operable by a person who may be in a position of danger relative to the machinery; to a clutch and a clutch release device wherein the power for operating the machine is exerted to release the clutch; to a control for a quick release safety clutch wherein the control is not responsive to stresses normally encountered in machine operation, but is always quickly responsive, sometimes automatically, to stresses incident to a person's dangerous position relative to the machine; and to a clutch wherein high torque power transmission through the clutch is positive, yet is self-contained relative to the stresses incident to release of the clutch.

In the drawings:

FIGURE 1 is a perspective of a lower portion of the delivery end of a forage wagon equipped with my invention and showing a representative use of my safety release mechanism.

FIGURE 2 is a perspective of the safety release clutch and environmental power connections, with the spring balanced latch poised in readiness for a clutch release operation.

FIGURE 3 is a fragmentary vertical section through the clutch.

FIGURE 4 is a section on line 4—4 of FIGURE 3.

FIGURE 5 is a section on line 5—5 of FIGURE 3, certain parts of the clutch release mechanism being broken away to show parts in vertical section.

FIGURE 6 is a fragmentary detail showing parts of the rockable clutch drive connection and its detent.

FIGURES 7, 8, 9 and 10 show fragmentarily the positions successively of the driving and driven parts of the clutch as they move from clutch engaged to clutch released positions.

FIGURE 11 is a perspective of the rockable clutch pin and its actuating striker pin.

The invention is shown in an environment showing typically an application to a dangerous mechanism comprising a forage crop wagon 10 wherein forage crop material is carried and from which the forage crop may be delivered by power driven machinery including, as fragmentarily shown in FIGURE 1, a conveyor 11 to advance the forage crop material forwardly toward the front end 12 of the wagon; and as is common in forage wagon construction, sets of beaters 13 and 15 rapidly revolve to disintegrate the mass of material crowding forward toward cross delivery auger 16. This cross delivery auger forces the forage material out of a trough-shaped delivery duct 17. Since the beaters are so rapidly revolving as to throw some of the material forwardly and since there must be inspection from time to time of the conditions prevailing in the upper portion of the forward part of the forage wagon, a hopper-like portion 20 as shown in FIGURE 1 projects somewhat forwardly of the forward wall 12 of the forage wagon. Also, because the delivery of the forage material out of the trough involves congestion of forage material in the trough 17, a part of a side wall 21 of the forage wagon is open at 22 for inspection purposes. The hopper portion 20 of the wagon and the open portion of the side wall at 22 therefore represent possible danger points if a careless operator inserts his arms or portions of his body against rapidly revolving moving parts.

A forage wagon such as that described in part above is, of course, intended to be pulled by a tractor or other power equipment, and the power for operation of the beaters 13–15 and the conveyor 11, plus the cross conveyor auger 16 is furnished to a shaft 25 from the well-known power take-off of the tractor. In this instance, the torque applied to shaft 25 is carried through a transfer gear case 26, and it is between the output of the gear case 26 and general utility shaft 28 that the safety release mechanism and particularly the clutch 27 is located. It will be understood that the general utility shaft 28 carries power to the operating mechanism of the forage wagon above described.

Referring now to FIGURES 3 to 10 inclusive, it will be seen that clutch 27 comprises two principal flanged hubs, a driving flanged hub 30 and a driven flanged hub 31. Flanged hub 30 is pinned at 32 upon a stub shaft 33 comprising the output shaft of gear case 26. This output shaft is concentric with shaft 28 and flanged hub 31 is pinned at 34 upon shaft 28. It will be noted that the hub of the flanged hub 31 is counterbored to receive a sleeve bearing at 35, and the shaft 33 extends into this bearing equipped portion of hub 31 to preserve the alignment of the parts.

Peripherally the flange of flanged hub 30 is provided with cupped grooves 36 and these provide semi-cylindrical groove walls, the axes of which are respectively parallel to the axes of the shafts 28 and 33.

Flanged hub 31, as shown clearly in FIGURES 2 and 5, is provided with two symmetrical bosses 40 and 41, respectively. Boss 41 is purely a counterbalance for boss 40 and the equipment mounted to it, and the bosses are arranged and positioned so as not to interfere with the face to face relationship of the flanged portions of the hubs 30 and 31 (see FIGURE 3).

Through the boss 40, there is a bore 42, the axis of which is parallel to shaft 28; and this bore is so disposed radially of shaft 28 that the radially innermost portion of the bore is aligned with the bottom of any groove 36 which is juxtaposed to bore 42. In bore 42, there is a rockable clutch pin 43 which extends through the boss, through the flange of the flanged hub 31 and extends sufficiently therebeyond so that a portion of the pin is receivable in a groove 36. However, that portion of pin 43 which extends beyond the flange of flanged hub 31 and overlies the flange of flanged hub 30 is relieved as shown clearly in such views as FIGURES 7 to 10 inclusive, with the result that if pin 43 takes the position shown in FIGURE 6, a greater part of unrelieved portion 44 is disposed in the particular groove 36 and provides a "key" to transmit power from shaft 33 and its flanged hub 30 to the flange of flanged hub 31 and thus to the driven shaft 28 in the power connections.

As stated above, the position of the key portion 44 of pin 43 is partially within groove 36 because a slightly less than 90° oscillation of pin 43 is accomplished in a clutch release operation. In such an operation, the oscillation of pin 43 is accomplished in a sweeping movement of actuating finger 45 which provides a handle for oscillation of pin 43 as will be clear from an examination of FIGURES 4 to 10 inclusive.

Finger 45 is fixed to pin 43 in a bore 46 provided for that purpose, and the finger extends outwardly, radially through a slot 47 in boss 40. This slot 47 is of ample circumferential extent with respect to the outer portion of the boss 40 to permit finger 45 to swing from a position of complete engagement of key 44 with a groove 36 to a position providing for complete removal of the key from such a groove (see FIGURE 10).

To assure key engaged relation of the unrelieved part of pin 43 in a groove 36, a spring pressed ball detent 48 in a radial bore 49 in boss 40 bears into a notch 50 in pin 43 to assure that the pin 43 and its key portion 44 will remain in power driving relation between the two flanged hubs 30 and 31 respectively despite vibration and irregularities in power application through shafts 28 and 33. But this detent is insufficient to prevent ready release of key 44 from a groove 36 in the flange of hub 30 if a definite force is used to prevent finger 45 from following its usual path of travel during rotation of shafts 28 and 33 with their associated parts.

As shown in FIGURES 2 and 5, a bracket 51 mounted to the forage wagon includes sturdy spaced uprights 52 and 53, and these uprights support a trip lever pin 54 which supports trip lever 55 and about which this trip lever 55 is oscillatable from a normally retracted position shown in FIGURE 2 to a position as that shown in FIGURE 5 in which the L shaped tip 56 of the trip lever 55 is in the path of rotation of finger 45.

The trip lever 55 is normally held in the position shown in FIGURE 2 by a tension spring 57. One end of this spring 57 is secured to a pin 58 mounted to the two side plates 52 and 53 of bracket 51. And the other end of the tension spring 57 is hooked into the end 59 of trip lever 55. Thus in the normally retracted position of the trip lever 55 as shown in FIGURE 2, the tip 56 of the trip lever is withdrawn from the path of movement of finger 45 and as long as the machinery is being safely operated with interlocked flanges of the respective hubs, the key portion 44 of pin 43 may remain in the position shown in FIGURE 4 to transmit power from shaft 33 to shaft 28.

Across the front margin of the hopper-like portion 20 of the forage wagon or across any area of danger in a machine equipped with this invention, there is a safety bar 60 mounted rockably upon safety bar arms 61 and 62, respectively, and safety bar arm 61 has a stop 63 secured thereto in such position as to limit the rockability of the safety bar 60 in one direction. As shown in this particular forage wagon, stop 63 bears upon the hopper portion 20 when the safety bar 60 is slightly overcenter toward the front of the machine or to the left as seen in FIGURE 1. Between the safety bar 60 and trip lever 55, there is a flexible tension member such as a rope 65 secured to bar 60 at 66 and secured to trip lever 55 at 67 adjacent the tension spring 57 at 59. There it will be seen that tension spring 57 thus pulls the safety bar 60 forwardly, and the position of the flexible tension rope 65 about the forward margin of the hopper 20 disposes the rope within easy reach of an operator.

Along any portion of the machine equipped with this invention where danger may be involved in power operated operation of the machine, a rope such as that shown at 68 is extended from its connection, for instance at 69, to a portion of the machine at 70 within ready grasping range of a person working in zone 22.

Thus anyone working in the vicinity of the hopper 20 or anyone working in a danger position adjacent moving parts as for instance at 22 may pull upon rope 65 or 68 or merely by leaning against bar 60 may pull upon the tension rope 65, oscillate trip lever 55 and dispose L shaped tip 56 of trip lever 55 in the path of movement of finger 45. Instantly, since the shafts 33 and 28 are rapidly revolving, finger 45 is oscillated to the position shown in FIGURE 5 so as to dispose key 44 in the position shown in FIGURE 10. All power connection between shaft 33 and shaft 28 is instantly disconnected and the machinery stops. No centrifugal forces then persist for return of the finger 45 to a position which will place key 44 in a groove 36, and manual movement of the finger at a time when the shaft 33 is not rotating will be necessary to dispose the key 44 in a groove 36 for further operation of the machinery.

Reference has been made to the instantaneous release of the clutch, and an examination of FIGURES 7 to 10 inclusive will indicate how the application of forces through the clutch assist in the release of the clutch commencing with the very first slight oscillation of finger 45 away from the position shown in full lines in FIGURE 4. It will be understood that the flange of hub 30 is rotating as shown by the arrow in FIGURE 4 and that the unrelieved portion of pin 43 at 44 is the sole driving connection between hub 30 and hub 31. A single momentary contact of finger 45 with the portion 56 of the trip lever 55 to start the oscillation of finger 45 and pin 43 will cause the margins of the groove 36 to bear upon the "nose" 75 of key 44 as seen in FIGURES 7 and 8 to force the oscillation of pin 43 until, as seen in FIGURE 9, the flat surface at 76 of key 44 will be provided with a camming action by the edge of groove 36 at 77 to complete the movement of the key 44 out of the groove (FIGURE 10).

In stand-by position, during ordinary safe operation of the machine, the key 44 is in power drive relation between the shafts. When a safety shut down is called for, either by inadvertent pressure against bar 60 to press it toward hopper portion 20 of the machine, or by a pull on one of the ropes, the only stress on the finger 45 or the trip lever 55 is that incident to the starting of pin 43 oscillation. This stress is taken up between the finger 45 and the pin 43 on the one hand, and the tip 56 of the trip lever and the pin 43 on the other hand. The only stress on the rope is involved in the rocking of the trip lever contra to spring 57.

It will further be noted that a direct downward force upon safety bar 60 will not unnecessarily trip the safety clutch. Only when interaction of a moving person or other force against the bar in a direction toward the hopper or in direction of the danger zone will the trip be released. In fact, such forces as falling bales of hay or large clumps of forage in a falling direction in the hopper will not trip the clutch.

I claim:

1. A forage wagon comprising at least one component adapted to be power driven, power transmission means connected to said component and including a clutch comprising a rotatable first member having a recess therein, a second member mounted for coaxial rotation with said first member, a pin having a main part and a relieved end part, means mounting said main part of said pin in said second member for rotation therewith and for rotation relative thereto between a first position locating said relieved end part clear of said recess whereby, said first and second members are disengaged, and a second position locating said relieved end part in engagement with said recess, whereby said first and second members are in driving engagement, and a finger extending rigidly from said pin beyond said second member, a trip member mounted on said forage wagon for movement relative to a position engageable with said finger to shift said pin to said first position when said pin is in said second position and said first member is rotating, means connected to said trip member and to said forage wagon for biasing said trip member away from its said position, and flexible means connected to said forage wagon and to said trip member and extending adjacent to said component in readily accessible location to an operator for affording movement of said trip member against said biasing means to its said position and consequent shifting of said pin to its first position.

2. A forage wagon comprising an apron conveyer, a beater, a delivery auger, power transmission means on said forage wagon connected to said conveyer, to said beater, and to said delivery auger, and including a clutch comprising a rotatably mounted first member having a recess therein, a second member mounted for coaxial rotation with said first member, a pin having a main part and a relieved end part, means mounting said main part of said pin in said second member for rotation therewith and for rotation relative thereto between a first position locating said relieved end part clear of said recess, whereby said first and second members are disengaged, and a second position locating said relieved end part in engagement with said recess whereby said first and second members are in driving engagement, and a finger extending rigidly from said pin beyond said second member, a trip member mounted on said forage wagon for movement relative to a position engageable with said finger to shift said pin to said first position, when said pin is in said second position and said member is rotating, means connected to said trip member and to said forage wagon for biasing said trip member away from its said position, and means connected to said forage wagon and to said trip member and extending in readily accessible location to an operator for affording movement of said trip member against said biasing means to its said position and consequent shifting of said pin to its first position.

3. A forage wagon according to claim 2 wherein said means affording movement of said trip member comprises a first element located adjacent to said beater, a second element connected to said first element and extending adjacent to the delivery end of said auger, and a third element connecting said first element and said trip member, whereby displacement of any one of said elements affords movement of said trip member to its said position.

4. A clutch comprising a support, a first member rotatably mounted on said support and having therein a recess, a second member mounted on said support for coaxial rotation with said first member, a pin having a main part and a relieved end part, means mounting said main part of said pin in said second member for rotation therewith and for rotation relative thereto between a first position locating said relieved end part clear of said recess whereby said first and second members are disengaged, and a second position locating said relieved end part in engagement with said recess, whereby said first and second members are in driving engagement, and a finger extending rigidly from said pin beyond said second member, a trip member mounted on said support for movement relative to an operating position engageable with said finger to shift said pin to said first position when said pin is in said second position and said first member is rotating, means connected to said trip member and to said support for biasing said trip member to a position retracted with respect to said operating position, and means connected to said trip member for affording movement of said trip member against said biasing means to said operating position, thereby affording consequent shifting of said pin to its first position.

5. A clutch comprising a support, a driving member rotatably mounted on said support and having a recess therein, a driven member mounted for coaxial rotation with said driving member, a pin having a main part and a relieved end part, means mounting said main part of said pin in said driven member for rotation therewith and for rotation relative thereto between a disengaged position locating said relieved end part clear of said recess whereby said driving and driven members are disengaged, and an engaged position locating said relieved end part in engagement with said recess, whereby said driving and driven members are in driving engagement, and a finger projecting rigidly from said pin and extending beyond the periphery of said driven member when said pin is in said engaged position and extending wholly within the periphery of said driven member when said pin is in said disengaged position, a trip member mounted on said support for movement relative to an operating position wherein said trip member is engageable with said finger to shift said pin to said disengaged position when said pin is in said engaged position and said driving member is rotating, means connected to said trip member and to said support for biasing said trip member to a position retracted with respect to said operating position, and means connected to said trip member for affording movement of said trip member against said biasing means to said operating position, thereby affording consequent shifting of said pin to said disengaged position.

6. A clutch comprising a support, a driving member rotatably mounted on said support and having a series of recesses in the periphery thereof, a driven member mounted on said support for coaxial rotation with said driving member and having a circular periphery at a greater radial distance than the periphery of said driving member, a pin having a main part and a relieved end part, means mounting said main part of said pin in said driven member for rotation therewith and for rotation relative thereto between a disengaged position locating said relieved end part clear of said recesses whereby said driving and driven members are disengaged, and an engaged position locating said relieved end part in engagement with one of said recesses, whereby said driving and driven members are in driving engagement, and a finger projecting rigidly from said pin and extending beyond the periphery of said driven member when said pin is in said engaged position and wholly within said periphery of said driven member when said pin is in said disengaged position, a trip member pivotally mounted on said support about an axis normal to the path of said finger for movement relative to an operating position engageable with said finger to shift said pin to said disengaged position when said pin is in said engaged position and said driving member is rotating, movement of said trip lever to said operating position being limited by engagement of said trip member with said periphery of said driven member, means connected to said trip member and to said support for biasing said trip member to a position retracted with respect to said operating position, and means connected to said trip member for affording movement of said trip member against said biasing means to said operating position, thereby affording consequent shifting of said pin to its disengaged position.

References Cited by the Examiner

UNITED STATES PATENTS

| | | | |
|---|---|---|---|
| 391,004 | 10/1888 | Wright | 192—71 |
| 784,653 | 3/1905 | Beyer | 192—129 |
| 1,025,043 | 4/1912 | Allen | 192—28 |
| 1,387,972 | 8/1921 | Gauthier | 192—29 |
| 1,447,105 | 2/1923 | Thropp | 192—129 |
| 1,625,101 | 4/1927 | Schuyler. | |
| 2,513,453 | 7/1950 | Conner | 192—129 |
| 2,743,832 | 5/1956 | Kappelmann | 214—519 |
| 3,017,207 | 1/1962 | Lloyd | 192—71 X |
| 3,047,173 | 7/1962 | Raney | 214—519 |
| 3,161,269 | 12/1964 | Janssen | 194—24 |

DAVID J. WILLIAMOWSKY, *Primary Examiner.*

BROUGHTON G. DURHAM, *Examiner.*